Dec. 14, 1948.    G. KEITH    2,456,560

RECEPTACLE CLOSURE MEANS

Filed Feb. 14, 1944

Inventor

Glenn Keith

By Dye + Kirchner

Attorneys

Patented Dec. 14, 1948

2,456,560

UNITED STATES PATENT OFFICE 2,456,560

RECEPTACLE CLOSURE MEANS

Glenn Keith, East Detroit, Mich., assignor of one-fourth to Milton M. Weinstein, one-tenth to Elias Goldberg, one-tenth to Harry Weinstein, one-tenth to Barnett B. Covent, and one-tenth to William Mintz, all of Detroit, Mich.

Application February 14, 1944, Serial No. 522,355

4 Claims. (Cl. 215—43)

The present invention relates to sealing members and more particularly to means for tightly sealing the orifice of a vessel or container. Devices embodying the fundamental principles of the invention may take various forms, such as caps for vessels such as bottles, jars and the like, or gasket-type sealing means adapted to be interposed between a vessel and its closure.

The general objects of the invention are concerned with providing a sealing means which will be economical to manufacture, easy to apply and remove, and durable in use, and an incidental object and advantage includes the use of materials which are abundant and regularly obtainable in domestic markets.

In order to seal the orifice of a vessel or container it is necessary to provide a cap, plug or other type of closure member to cooperate with a seat surrounding the orifice. Generally some portion of the closure member is formed to make tight and leakproof engagement with the seat, and it is to this type of closure that the present invention relates.

A feature of the invention resides in making the sealing means out of a member having a distensible, resilient or yieldable wall which confines a fluid in a chamber in such as way that the imposition of pressure, such as that resulting from the act of tightening the closure member on the vessel, tends to compress the fluid and thereby distend the chamber wall or walls into sealing engagement with an adjacent seat. Since the fluid pressure acts equally in all directions in accordance with well known principles, every point on the distensible surface is urged against the seat, and by suitable selection of material and thickness characteristics for the wall providing the distensible surface it is possible to have the sealing member distend or yield so as to fill every large or minute irregularity in the seat. In this way a very effective seal is easily provided.

The material of which the wall defining the fluid-containing chamber and providing the sealing surface is formed is preferably a suitable synthetic plastic. Satisfactory examples of such plastics will be suggested hereinafter, but it is sufficient for the present to state that any material may be used which has sufficient mechanical strength, appropriate resistance to such temperatures and materials as may be encountered in use, and sufficient elasticity to be distensible or yieldable in the necessary degree. A large number of such materials are now available, as is well known to those skilled in the art, and no difficulty will be experienced by such persons in selecting entirely adequate plastic materials for any ordinary sealing purpose.

The invention will now be more fully explained in terms of a certain illustrative embodiment as shown in the accompanying drawing, in which Fig. 1 is a side elevational view of the upper part of a fruit jar showing the cap provided with a form of sealing means contemplated by the present invention;

Figure 1:
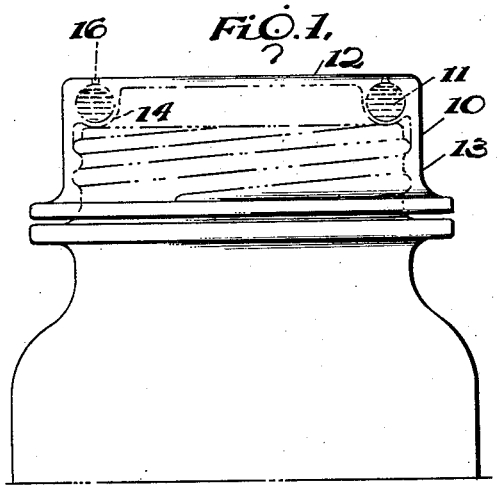
Figure 2:
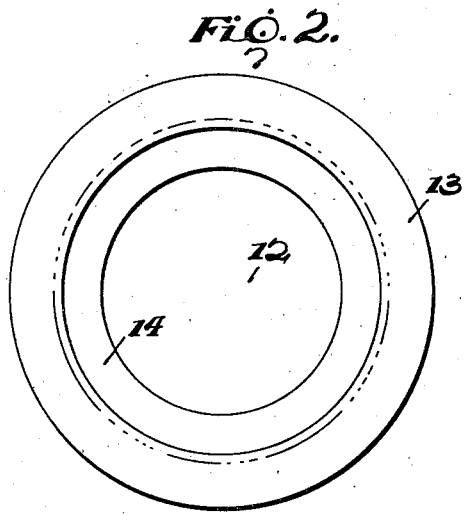
Fig. 2 is a bottom plan view of the cap shown in Fig. 1.

It is to be understood that the foregoing views and description of them in this specification are given merely by way of illustration of the principles of the invention and not to imply any limitations to their precise details, since these details may be varied within the scope of the appended claims.

The material which I prefer to use for the closure contemplated by the present invention is a plastic which may be formed to provide walls of the thinness shown in the figures and will be mechanically strong and moderately resilient, distensible or yielding.

The sealing means is made an integral part of the cap 10, here shown as a screw cap, being provided in the form of an annular chamber 11 located in the closed end of the cap adjacent to its top 12 and its side wall 13. The entire cap is best made of suitable plastic, but all parts are made too thick to be readily distensible except the inner wall 14 of the chamber 11, which is made thin enough to be distensible. It is this wall 14 of course which engages in sealing contact with the seat provided on the upper end of the jar neck.

Figure 3:
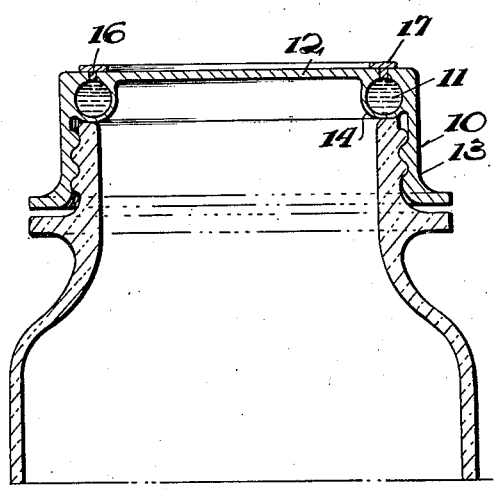
Fig. 3 is a central longitudinal section of the upper part of a fruit jar showing a cap provided with a modified type of sealing means.

The chamber 11 may be filled with a suitable liquid by first forming the cap with a slot 16 opening through the top of the cap. Liquid may be introduced through this slot and the slot may then be closed in any convenient way, e. g., an annular plate 17 of plastic may be cemented or welded to close the slot as shown in Fig. 3.

In any case a fluid-containing chamber is made integral with the cap, located, when the cap is in place on the jar, opposite the seat provided on the end of the jar, and having engageable with such seat a comparatively thin distensible wall 14 which becomes distended into tight seating engagement with the jar when the cap is turned down on the jar neck.

The liquid may be water, preferably having in solution some suitable freezing point depressant, in order to prevent freezing of the liquid if subjected to low temperatures. An oil fill may be used, but in any case it will be appreciated that the liquid is substantially incompressible, so that pressure applied to the chamber 11 will result in distending its walls in proportion to the pressure applied. I prefer to use a liquid because a gas fill, such as air, is compressible without material distension of the walls of the chamber and hence much greater compression forces must be applied to a chamber filled with air to produce appreciable distension of its walls.

As has been stated, the selection of specific plastics for any expected conditions of use presents no difficulty in view of the wide range of properties now afforded by the numerous plastics which are readily available. Because the conditions of use, particularly in respect of temperatures, character of vessel contents, degree of pressure which may be expected to be applied, etc., will necessarily vary quite widely, it is impractical to recommend any particular plastic. I might, however, state that some of the vinyl compounds, such as the thermoplastic formed by the copolymerization of vinylidene and vinyl chlorides produced by Dow Chemical Company under the trade name "Saran" are suitable for conditions where the temperatures under conditions of use will not exceed approximately 170° F., and where higher temperatures are expected to be met some of the well known phenol-formaldehyde condensation products, which have softening points as high as 300° to 480° F., may be used.

I claim:

1. A sealing member for the orifice of a container vessel of the class consisting of bottles and jars, said member comprising a cap having a closed chamber of annular shape defined by a wall which is integral with the cap and is formed of distensible material, and a liquid fill in the chamber, said cap being adapted to be pressed onto the vessel so as to engage said wall with a seat formed on the vessel and distend the wall into sealing engagement with said seat.

2. A sealing member for the orifice of a container vessel of the class consisting of bottles and jars having an opening surrounded by an annular seat, said sealing member comprising a cap formed with a closed internal chamber of annular shape defined by the body of the cap and by a distensible wall integral with said body, a liquid fill in said chamber, and means for securing the cap to the vessel so as to apply pressure to the liquid and thereby distend said wall into sealing engagement with said seat.

3. A sealing member for the orifice of a container vessel of the class consisting of bottles and jars having an opening surrounded by an annular seat, said sealing member comprising a unitary cap having a relatively thick and non-deformable body provided with a relatively thin and distensible wall having its edges integrally connected to the body and its central zone spaced therefrom to form with the body a closed annular chamber, a liquid fill in said chamber, and means for securing the cap to the vessel so as to apply pressure to the liquid and thereby distend said wall into sealing engagement with said seat.

4. A closure cap for a container of the class consisting of bottles and jars having an opening surrounded by an annular seat, said cap comprising a relatively thick and substantially non-deformable body having an annular chamber provided with a relatively thin and deformable wall integral with the body and adapted to engage the container seat when the cap is in closing position on the container, a port extending through the cap wall opposite the deformable wall for the introduction of liquid into the chamber, a liquid fill in the chamber, and means sealing the port and thereby confining the fill in the chamber.

GLENN KEITH.

REFERENCES CITED

The following references are of record in the file of this patent:

UNITED STATES PATENTS

| Number | Name | Date |
|---|---|---|
| 228,696 | Thompson | June 8, 1880 |
| 794,987 | Kneuper | July 18, 1905 |
| 129,546 | Schou | Aug. 28, 1906 |
| 1,439,452 | Shaw | Dec. 19, 1922 |
| 1,917,175 | Wills et al. | July 4, 1933 |
| 1,966,202 | Pfefferle | July 10, 1934 |
| 2,072,536 | Trickey et al. | Mar. 2, 1937 |
| 2,176,057 | Burkardt | Oct. 17, 1939 |

FOREIGN PATENTS

| Number | Country | Date |
|---|---|---|
| 528,359 | Great Britain | 1940 |
| 724,589 | France | Jan. 29, 1932 |